(12) United States Patent
Shahar

(10) Patent No.: US 7,866,088 B1
(45) Date of Patent: Jan. 11, 2011

(54) BARRIER MULCH FILMS

(75) Inventor: Ayal Shahar, West Terre Haute, IN (US)

(73) Assignee: Cadillac Products Packaging Company, Troy, MI (US)

( * ) Notice: Subject to any disclaimer, the term of this patent is extended or adjusted under 35 U.S.C. 154(b) by 625 days.

(21) Appl. No.: 11/904,486

(22) Filed: Sep. 27, 2007

Related U.S. Application Data

(60) Provisional application No. 60/848,750, filed on Oct. 2, 2006.

(51) Int. Cl.
*A01G 7/00* (2006.01)

(52) U.S. Cl. .......................................... 47/9

(58) Field of Classification Search .................. 47/9, 47/1.01 R, 20.1, 32.3; 428/474.4
See application file for complete search history.

(56) References Cited

U.S. PATENT DOCUMENTS 3,592,792 A * 7/1971 Newland et al. ............ 523/126
5,846,661 A * 12/1998 Basset et al. ............. 428/474.4

FOREIGN PATENT DOCUMENTS

AU          A-1110792       *   2/1992

* cited by examiner

*Primary Examiner*—Timothy D Collins
*Assistant Examiner*—Monica Williams
(74) *Attorney, Agent, or Firm*—Philip L. Bateman

(57) ABSTRACT

Vegetables are grown by (a) applying an effective amount of a fumigant to the soil where the vegetables will be grown; (b) placing a barrier mulch film over the fumigated soil; (c) planting vegetables in the soil under the barrier mulch film; (d) maintaining the barrier mulch film in place over the soil for substantially the entire growing season to reduce weeds and to control temperature; and (e) harvesting the vegetables. The barrier mulch film contains: (i) an upper layer comprising a polyolefin and a sunlight reflecting/absorbing agent; (ii) a second layer comprising an adhesive; (iii) a third layer comprising a barrier plastic; (iv) a fourth layer comprising an adhesive; and (v) a lower layer comprising a polyolefin and a sunlight absorbing agent.

12 Claims, No Drawings

BARRIER MULCH FILMS

CROSS-REFERENCE TO RELATED APPLICATION

This application claims the benefit of U.S. Provisional Application Ser. No. 60/848,750, Oct. 2, 2006.

FIELD OF THE INVENTION

This invention relates to plant husbandry. More particularly, this invention relates to growing vegetables using barrier mulch films.

BACKGROUND OF THE INVENTION

Vegetables are the edible leaves, roots, flowers, seeds, stems, and other parts of certain plants. The term "vegetable" is also used herein as the context requires to refer to the entire plant. Most vegetables are annuals in that they live for only one growing season.

When vegetables are grown commercially, it is common to fumigate the soil immediately before planting with a gas that kills weeds and organisms (e.g., nematodes). Methyl bromide is the most widely used fumigant, although it has been identified as an ozone depleting compound and its use is being curtailed under the provisions of the Montreal Protocol effective Jan. 1, 2005. Other common fumigants include chloropicrin, methyl chloride, ethylene dibromide, hydrogen cyanide, phosphine, carbon dioxide, methyl sodium, 1,3-dichloropropene, 3,5-dimethyltetrahydro-1,3,5-thiadiazin-2-thione, and sodium tetrathiocarbonate. To maximize the effectiveness of the fumigation and to reduce the escape of the fumigants into the atmosphere, the treated soil is covered with a film that slows the escape of the fumigant. These films are commonly known as fumigation films or barrier films and are typically removed after a few days.

During the growing season, it is common to cover the soil around the vegetables with a mulch. Mulch is a material that inhibits weeds, reduces wash-outs from heavy rains, traps moisture, and controls temperature by reflecting and/or absorbing sunlight. A variety of organic materials (e.g., wood chips, bark, pine needles, leaves, straw, hay) and inorganic materials (e.g., rocks and gravel) have been used as mulches. In recent years, the use of plastic films as mulch has increased. These films are commonly known as mulch films and are typically left in the field for the entire growing season. During the growing season, the films are contacted from below by the roots and stems of plants, rocks, soil particles, and the like, and are contacted from above by workers and machinery. The plastic mulch films are also subjected to prolonged exposure to sunlight.

A variety of plastic films (also known as sheets or sheetings) have been disclosed for use as mulches. Polyolefins (polymers of olefin units such as ethylene and propylene) have been used as mulches. Polyolefins are relatively inexpensive and have desirable physical properties, including tensile strength, impact and puncture resistance, tear resistance, flexibility, and resistance to damage from sunlight. Unfortunately, polyolefins are relatively porous. In other words, they have relatively high gas permeabilities (also known as diffusivities) so that the fumigants are able to pass through them relatively quickly. Therefore, they are poor barriers for fumigants.

Plastics that are effective fumigant barriers are generally stiff and have poor tear and puncture resistance properties. Such plastics include polyamides (an example of which is nylon) which contains repeating units of amides [—$CH_2$—CHCONH—], ethylene vinyl alcohol copolymers (commonly known as EVOH) which contain repeating units of ethylene [—$CH_2$—$CH_2$—] and of vinyl alcohol [—$CH_2$—CHOH—], polyethylene terephthalate (commonly known as PET) which contains repeating units of [—$C_{10}H_8O_4$—], polyvinylidene chloride (commonly known as PVDC) which contains repeating units of vinylidene chloride [—$CH_2$—$CCl_2$—], and polyvinyl alcohol (commonly known as PVOH) which contains repeating units of vinyl alcohol [—$CH_2$—CHOH—].

Various attempts have been made to provide multilayer plastic films for use as barriers and/or mulches. For example, Shoshani, Australian Patent Application No. 11107/92, published Aug. 27, 1992, discloses a coextruded multilayer plastic film for a barrier film. The film comprises a barrier layer such as polyamide, EVOH, PET, or polyurethane sandwiched between layers of polyolefin with optional adhesive tie layers. Multilayer plastic mulch films are also discussed in "Reducing Methyl Bromide Field Application Rates With Plastic Mulch Technology" by J. W. Nowling, The Institute of Food and Agricultural Services, University of Florida, published January 2002 and revised November 2005. There is no mention of sunlight reflecting/absorbing agents being present in these films.

As another example, Linde et al., U.S. Pat. No. 4,812,342, Mar. 14, 1989, disclose a tubular container consisting of an upper film sealed to a lower film at its edges. The lower film comprises a gas-permeable plastic such as polyolefin. The upper film comprises a coextruded multilayer barrier film comprising layers of a polyolefin, an adhesive, a barrier layer, another adhesive layer, and another layer of polyolefin. Suitable barrier layers for the upper film are saponified ethylene/vinyl acetate copolymers, polyvinylidene chloride, polyester, polyvinyl alcohol, and polyamide. The container is placed on the ground and a fumigant gas is added through a valve into the interior of the container. The container is held in place for a few days to allow the fumigant gas to diffuse through the lower film to the space above the soil. The container is then removed and, if desired, a separate mulch is applied to the field. The Linde et al. container is unsuitable for conventional fumigation because the lower film is so permeable that it would allow excessive amounts of the fumigant into the container.

As a further example, Basset et al., U.S. Pat. No. 5,846,661, Dec. 8, 1998, disclose, inter alia, a coextruded multilayer barrier film comprising layers of polyolefin, a coextrusion binder, a barrier layer, another coextrusion binder, and another layer of polyolefin. The barrier layer comprises a mixture of polyamide and polyolefin that may be plasticized and may optionally contain fillers such as carbon black. Unfortunately, the presence of blended polyolefin in the barrier layer increases its permeability and making the polyamide compatible with the polyolefin greatly increases the cost.

Accordingly, a demand exists for an improved method of growing vegetables. More particularly, a demand exists for a method of growing vegetables using a single multilayer barrier mulch film that is left in the field for fumigation and for the entire growing season.

SUMMARY OF THE INVENTION

The general object of this invention is to provide an improved method of growing vegetables. A more particular object is to provide a method of growing vegetables that reduces the amount of fumigant that must be applied to the soil to achieve a desired effect on weeds and/or organisms.

I have invented a method of growing vegetables in soil. The method comprises: (a) applying an effective amount of a fumigant to the soil; (b) placing a barrier mulch film over the fumigated soil; (c) planting vegetables in the soil under the barrier mulch film; (d) maintaining the barrier mulch film in place over the soil for substantially the entire growing season to reduce weeds, increase moisture, and control temperature; and (e) harvesting the vegetables. The barrier mulch film comprises: (i) an upper layer comprising a polyolefin and a sunlight reflecting/absorbing agent; (ii) a second layer comprising an adhesive; (iii) a third layer comprising a barrier plastic; (iv) a fourth layer comprising an adhesive; and (v) a lower layer comprising a polyolefin and a sunlight absorbing agent. The third layer, which contains the barrier plastic, is essentially free of blended polyolefin.

The method reduces the amount of fumigant needed, reduces the growth of weeds, increases moisture, controls the temperature, and eliminates the need to remove a barrier film and replace it with a mulch film.

DETAILED DESCRIPTION OF THE INVENTION

The method of this invention comprises growing vegetables using a single multilayer barrier mulch film. The first step of the method is to apply an effective amount of a fumigant into the soil where the vegetables will be planted. The term "effective amount" means an amount sufficient to kill weeds and/or organisms. As previously mentioned, methyl bromide is the most common fumigant but a wide variety of other gases are also used as fumigants. The fumigant is applied to the soil using conventional techniques.

The second step is to place the barrier mulch film over the fumigated soil as soon as practical after fumigation. The barrier mulch film is anchored in place using conventional techniques. The preferred method of anchoring is to cover the edges of the film with soil. As discussed in detail below, the film helps contain the fumigant near the soil. The fumigant is allowed to act upon the target weeds and organisms for a short period of time, typically a few days. After the desired period of time, the vegetables are planted in the soil under the film. The vegetables are commonly planted through slits cut in the film. The vegetables then grow upward through the slits.

The barrier mulch film is left in place for substantially the entire growing season. The film is preferably left in place for more than 90 percent of the growing season and most preferably left in place for the entire growing season. As discussed in detail below, the film reduces weeds, increases moisture, and controls temperature. When the growing season is completed, the vegetables are harvested using conventional techniques. The barrier mulch film is removed after harvest and discarded or saved for further use.

Turning now to the multilayer barrier mulch film itself, the first layer (which is the upper layer when applied to the field) comprises a polyolefin. Preferred polyolefins are polyethylene (which contains repeating units of ethylene [—$CH_2$—$CH_2$—]) and polypropylene (which contains repeating units of propylene [—$CHCH_3$—$CHCH_3$—]). The most preferred polyolefin is linear low density polyethylene (LLDPE), an article of commerce. Linear low density polyethylene is relatively inexpensive, widely available, and has superior physical properties.

The first (upper or top) layer also comprises a sunlight reflecting/absorbing agent, i.e., an agent that either reflects sunlight or absorbs sunlight. In general, sunlight reflecting agents are used when cooling of the soil is desirable and sunlight absorbing agents are used when heating of the soil is desirable. The choice of cooling or heating depends on the time of year when the vegetable is planted, on climate conditions, on the identity of the vegetable, and on other factors. Sunlight reflecting/absorbing agents are generally colored pigments of the type that are commonly used to color plastics, paints, and the like. For example, a suitable sunlight reflecting agent is a white pigment such as titanium oxide. A suitable sunlight absorbing agent is a black pigment such as carbon black. Colored agents are used to reflect sunlight of a particular wavelength. Light colored agents commonly contain a white pigment and dark colored agents commonly contain a black pigment.

The second layer is an adhesive. The adhesive layer is sometimes known as a tie layer because it holds two layers together. The adhesive layer preferably comprises extrudable adhesives such as anhydride modified linear low density polyethylene or ethylene vinyl acetate.

The third layer comprises a barrier plastic. The term "barrier plastic" is used herein to mean a plastic that has a low permeability (diffusivity) for methyl bromide and other fumigants. The diffusivity of a plastic film can be quantified by the measuring the volume of a particular gas in cubic centimeters which passes in one day (24 hours) through a sheet of the material having a surface area of 100 square inches, a thickness of one mil (one one-thousandths of an inch, 0.001 inches), with a pressure differential of one atmosphere, at zero percent relative humidity, and at a temperature of 70° F. Measurements of the diffusivities of methyl bromide and other fumigants are not widely available. However, these diffusivities are believed to correlate with the oxygen diffusivity and the oxygen diffusivity for many plastic films is known. Accordingly, the oxygen diffusivity of a plastic film provides one way of quantitatively defining a barrier plastic. Another way of quantitatively defining a barrier plastic is to compare its diffusivity to that of polyethylene. As used herein, a barrier plastic is a plastic that has an oxygen diffusivity of less than about fifty cubic centimeters per day and that has a methyl bromide diffusivity of less than one tenth (0.1) that of polyethylene.

Commercially available plastics that are believed to be barrier plastics, as that term is defined above, include polyamides (an example of which is nylon) which contains repeating units of amides [—$CH_2$—CHCONH—], ethylene vinyl alcohol copolymers (commonly known as EVOH) which contain repeating units of ethylene [—$CH_2$—$CH_2$—] and of vinyl alcohol [—$CH_2$—CHOH—], polyethylene terephthalate (commonly known as PET) which contains repeating units of [—$C_{10}H_8O_4$—], polyvinyl chloride (commonly known as PVC) which contains repeating units of vinyl chloride [—$CH_2$—CHCl—], polyvinylidene chloride (commonly known as PVDC) which contains repeating units of vinylidene chloride [—$CH_2$—$CCl_2$—], polyvinyl alcohol (commonly known as PVOH) which contains repeating units of vinyl alcohol [—$CH_2$—CHOH—], and polyurethane which contains repeating units of [—$R^1$—NH—$COOR^2$—]. The preferred barrier plastics are polyamides and ethylene vinyl alcohol copolymers (EVOH). The most preferred barriers are polyamides such as nylon.

The third layer preferably also comprises a plasticizer. A plasticizer is especially desirable when the barrier plastic comprises a polyamide. The plasticizer is present in an amount to improve the physical properties of the barrier layer without significant affecting its permeability (diffusivity). The preferred plasticizer is caprolactam ($C_6H_{11}NO$) because of its effectiveness and ease of use. When used with polyamides, caprolactam is typically present in an amount of about 3 to 40 weight percent and preferably about 5 to 30 weight percent.

The third layer is essentially free of blended high permeability plastics such as polyolefins. The presence of any appreciable amount of such plastics increases the permeability of the multilayer barrier mulch film. Any increase in permeability diminishes the ability of a film to contain the fumigant and reduce the quantity of fumigant required for the desired effect. Although the third layer is essentially free of blended polyolefin, it is understood that certain barrier plastics are made by co-polymerizing olefins with other monomers. For example, ethylene vinyl alcohol copolymers are made by co-polymerizing ethylene and vinyl alcohol monomers.

The fourth layer is an adhesive and is preferably similar or identical to the second layer.

The fifth (lower or bottom) layer is a polyolefin and is preferably similar in most respects to the upper layer. It differs from the upper layer in that the lower layer always contains a sunlight absorbing agent. The sunlight absorbing agent reduces the amount of sunlight reaching the soil and helps inhibit the growth of weeds. Weeds generally require more sunlight than vegetables. A suitable sunlight absorbing agent is a black pigment. The preferred black pigment is carbon black.

Additional layers are optional. For example, the single barrier layer can be replaced by two or more barrier plastic layers adjacent each other or joined by an adhesive layer, giving the multilayer barrier mulch film a total of seven or more individual layers.

Sunlight reflecting/absorbing agents are optionally added to layers other than the outer layers. For example, if maximum reflectance is desired, white pigment is added to the adhesive layers and to the barrier layer.

The multilayer barrier mulch film is preferably about 0.5 to 20 mils in thickness and is most preferably about 1 to 10 mils in thickness. The third, barrier layer preferably makes up about 5 to 70 percent of the thickness, the second and fourth adhesive layers preferably make up about 5 to 40 percent of the thickness, and the first and fifth outer layers preferably make up about 5 to 80 percent of the thickness.

The multilayer barrier mulch film is manufactured by a conventional coextrusion process in which each layer is formed and extruded separately. The layers are then disposed in a side-by-side relationship to form the multilayer film. Both flat die and concentric die coextrusion methods are suitable.

The use of the barrier mulch film greatly reduces the quantity of fumigant needed for a desired effect. When compared to the use of a polyolefin film, the use of the multilayer barrier mulch film of this invention reduces the quantity of methyl bromide needed by about forty percent. The barrier mulch film continues to provide benefits during the entire growing season. It reduces the growth of weeds by reducing sunlight, it increases moisture by slowing evaporation of water from the soil, and it controls the temperature by reflecting or absorbing sunlight as desired.

I claim:

1. A method of growing vegetables in soil, the method comprising:
   (a) applying an effective amount of a fumigant to the soil;
   (b) placing a barrier mulch film over the fumigated soil, the film comprising:
      (i) a first upper layer comprising a polyolefin and a sunlight reflecting/absorbing agent selected from the group consisting of sunlight reflecting agents and sunlight absorbing agents;
      (ii) a second layer comprising an adhesive;
      (iii) a third layer comprising a barrier plastic comprising a polyamide and about 5 to 30 weight percent caprolactam, the third layer being essentially free of blended polyolefin;
      (iv) a fourth layer comprising an adhesive; and
      (v) a fifth lower layer comprising a polyolefin and a sunlight absorbing agent;
   (c) planting vegetables in the soil under the barrier mulch film;
   (d) maintaining the barrier mulch film in place over the soil for substantially the entire growing season to reduce weeds, increase moisture, and control temperature; and
   (e) harvesting the vegetables.

2. The method of claim 1 wherein the upper layer and the lower layer comprise polyethylene or polypropylene.

3. The method of claim 2 wherein the barrier mulch film has a thickness of about 0.5 to 20 mils.

4. The method of claim 3 wherein the barrier mulch film is maintained in place over the soil for the entire growing season.

5. The method of claim 4 wherein the sunlight reflecting/absorbing agent of the upper layer comprises white pigment.

6. The method of claim 4 wherein the sunlight reflecting/absorbing agent of the upper layer comprises black pigment.

7. A method of growing vegetables in soil, the method comprising:
   (a) applying an effective amount of a fumigant gas to an area of soil;
   (b) covering the fumigated soil with a barrier mulch film comprising:
      (i) a first upper layer comprising a polyolefin and a sunlight reflecting/absorbing agent selected from the group consisting of sunlight reflecting agents and sunlight absorbing agents;
      (ii) a second layer comprising an adhesive;
      (iii) a third layer comprising a polyamide and about 5 to 30 weight percent caprolactam, the third layer being essentially free of blended polyolefin;
      (iv) a fourth layer comprising an adhesive; and
      (v) a fifth lower layer comprising a polyolefin and a sunlight absorbing agent;
   (c) planting vegetables in the covered soil under the barrier mulch film;
   (d) maintaining the barrier mulch film in place covering the soil for substantially the entire growing season to reduce weeds, increase moisture, and control temperature; and
   (e) harvesting the vegetables.

8. The method of claim 7 wherein the upper layer and the lower layer comprise polyethylene or polypropylene.

9. The method of claim 8 wherein the barrier mulch film has a thickness of about 0.5 to 20 mils.

10. The method of claim 9 wherein the barrier mulch film is maintained in place over the soil for the entire growing season.

11. The method of claim 10 wherein the sunlight reflecting/absorbing agent of the upper layer comprises white pigment.

12. The method of claim 11 wherein the sunlight reflecting/absorbing agent of the upper layer comprises black pigment.

* * * * *